W. SCOTT.
UNIVERSAL JOINT.
APPLICATION FILED APR. 28, 1913.
1,094,603.
Patented Apr. 28, 1914.
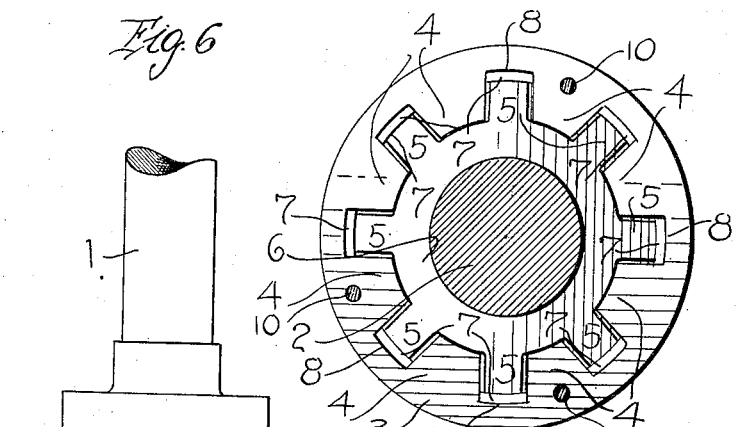
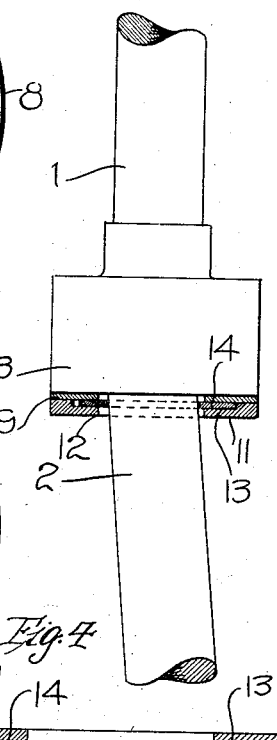
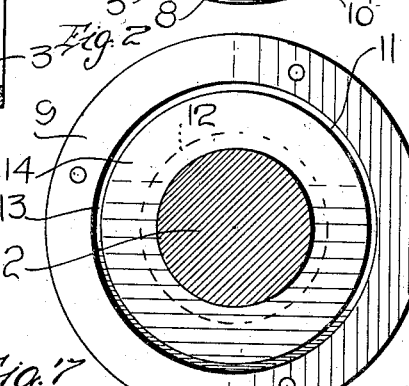
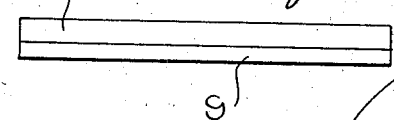
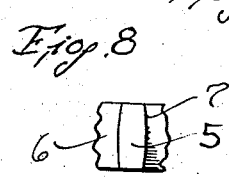
Inventor
WALTER SCOTT
Witnesses
Robert M. Sutphen
A. I. Hind
By Watson E. Coleman
Attorney

UNITED STATES PATENT OFFICE.

WALTER SCOTT, OF SHERIDAN, WYOMING.

UNIVERSAL JOINT.

1,094,603.   Specification of Letters Patent.   Patented Apr. 28, 1914.

Application filed April 28, 1913. Serial No. 764,230.

*To all whom it may concern:*

Be it known that I, WALTER SCOTT, a citizen of the United States, residing at Sheridan, in the county of Sheridan and State of Wyoming, have invented certain new and useful Improvements in Universal Joints, of which the following is a specification, reference being had to the accompanying drawings.

This invention relates to new and useful improvements in universal joints and more particularly to a joint of this character which is especially adapted for use upon automobiles and other motor driven vehicles, the object of the invention being to provide a joint of the above character adapted for connecting the transmission shafting on motor vehicles or shafting of other machinery which is required to be placed in an oblique position relative to each other.

Another object of the invention is to provide a universal joint of the above character which will possess advantages in points of efficiency and durability, is inexpensive of manufacture and at the same time is simple in construction and operation.

With the above and other objects in view, this invention consists in the novel features of construction and the combination and arrangement of parts to be hereinafter more fully described, pointed out in the claims and shown in the accompanying drawings, in which—

Figure 1 is a transverse sectional view through the shafting, looking toward the coupling; Fig. 2 is a transverse sectional view through the shafting showing the relative positions of the securing plate and the ring; Fig. 3 is a similar view; Fig. 4 is a transverse sectional view through the securing plate and washer; Fig. 5 is a side elevation of the coupling, the securing plate and washer being shown in cross section; Fig. 6 is a similar view; and Fig. 7 is an edge view of the washer and securing plate. Fig. 8 is a detail fragmentary view illustrating the curvature of the engaging walls of two sets of ribs.

Referring more particularly to the drawings, 1 and 2 indicate the two sections of shafting which are connected together by means of my improved joint. Formed on the shaft 1 is a hollow shell 3, which is preferably cylindrical in form and having internally projecting ribs or flanges 4 which are adapted to engage with the externally projecting ribs 5 formed upon the annular head 6 which is integrally formed with one end of the shaft 2. The ribs 5 are provided with the curved side walls 7 which are adapted to conform to the curvature of the side walls 8 upon the ribs or flanges 4 formed within the shell 3. It will be apparent that by having the contacting walls of the ribs 4 and 5 curved, it will greatly reduce the friction between the same.

The parts of my improved joint are united by inserting the head 6 within the shell 3, the ribs 5 interlocking with the ribs 4 and causing the two parts to move or rotate together whenever motion is imparted to either. Mounted upon the shaft 2 and secured to the end of the shell 3 is a washer plate 9, said plate being held securely in position by means of the screw bolts 10 which pass through the securing plate 11 and through the washer 9.

The securing plate 11 is provided with a centrally arranged opening 12 which is of a diameter somewhat larger than the shaft 2. Formed in the inner face of the plate 11 is an annular recess 13 within which is mounted a ring 14 which encircles the shaft 2, the outer periphery of said ring engaging the peripheral wall of the recess 13 to prevent the shafting from engaging the walls of the opening 12 within the securing plate 11. Thus it will be seen that the wear caused by the engagement of the shafting 2 with the walls of the opening 12 will be limited and the wear thus limited will be taken up by the ring 14 having its periphery engaging with the wall of the recess 13.

From the above it will be apparent that the two shafts 1 and 2 may be moved in any direction and disposed obliquely relative to each other, the ring 14 limiting the movement of the shaft 2 and preventing wear of the same upon the plate 11. It will be obvious that the two shafts may be quickly and readily disconnected by removing the screw bolts 10 and withdrawing the head 6 from the shell 3. It will also be obvious that the ends of the two shafts may be quickly and readily connected by inserting the head 6 within the shell 3 and placing the screw bolts in position. It will also be apparent that my device is extremely simple in construction and can be manufactured at comparatively low cost.

While I have shown and described the preferred form of my invention, it will be obvious that various changes in the details of construction and in the proportions may be resorted to for successfully carrying my invention into practice without sacrificing any of the novel features or departing from the scope of the appended claims.

What I claim is:—

1. A device of the class described including a shaft having a cylindrical shell formed on one end, ribs formed within said shell, a second shaft having a head, ribs formed on said head and adapted to engage with the first ribs, a securing plate mounted on the first shaft and having an annular recess therein, a ring encircling the second shaft and arranged within said recess, the periphery of said ring engaging the peripheral wall of the recess to limit the swinging movement of the second shaft and prevent the same from engaging the walls of the central opening within the securing plate.

2. The combination of a shaft having a cylindrical shell formed on one end, internally projecting ribs formed in said shell, a second shaft having an annular head formed on one end and adapted to be inserted within said shell, external ribs formed on said annular head and adapted to engage the ribs within the shell, a washer plate mounted upon the first shaft, a securing plate provided with a central opening of a diameter larger than the second shaft, screw bolts passing through the securing plate and the washer plate and engaging with the shell to securely retain the head within the shell, said securing plate being provided with an annular recess and a ring encircling the second shaft and arranged within said annular recess, the periphery of said ring engaging the peripheral wall of the recess to limit the swinging movement of the second shaft and prevent the same from engaging the walls of the central opening in the securing plate.

In testimony whereof I hereunto affix my signature in the presence of two witnesses.

WALTER SCOTT.

Witnesses:
M. STEELE,
OLIVER M. WALSH.